United States Patent
Bäse et al.

(10) Patent No.: US 9,160,793 B2
(45) Date of Patent: Oct. 13, 2015

(54) METHOD AND PEER NETWORK FOR ASCERTAINING THE PEER NETWORK ORIGINATING STATION FOR A FILE

(75) Inventors: Gero Bäse, München (DE); Robert Kutka, Geltendorf (DE); Jürgen Pandel, Feldkirchen-Westerham (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 679 days.

(21) Appl. No.: 12/085,999

(22) PCT Filed: Oct. 23, 2006

(86) PCT No.: PCT/EP2006/067678
§ 371 (c)(1),
(2), (4) Date: Jun. 4, 2008

(87) PCT Pub. No.: WO2007/065757
PCT Pub. Date: Jun. 14, 2007

(65) Prior Publication Data
US 2009/0043837 A1    Feb. 12, 2009

(30) Foreign Application Priority Data
Dec. 5, 2005  (DE) .......................... 10 2005 058 006

(51) Int. Cl.
G06F 15/16    (2006.01)
H04L 29/08    (2006.01)
H04L 29/06    (2006.01)

(52) U.S. Cl.
CPC ............ *H04L 67/104* (2013.01); *H04L 67/108* (2013.01); *H04L 63/12* (2013.01)

(58) Field of Classification Search
USPC ................................................ 709/200, 203
See application file for complete search history.

(56) References Cited

U.S. PATENT DOCUMENTS 5,915,027 A * 6/1999 Cox et al. .......................... 380/54
6,279,041 B1 * 8/2001 Baber et al. ................... 709/232
(Continued)

FOREIGN PATENT DOCUMENTS

JP    11-41286    2/1999
JP    2000-173177    6/2000
(Continued)

OTHER PUBLICATIONS

Zhao J., "A WWW Service to embed and prove digital copyright watermarks", Proc. of the European Conf. on Multimedia Applications, Services and Techniques, Univ. Catholique Louvain, Louvain, Belgium, vol. 2, 1996, pp. 695-709; Zhao J., "A WWW Service to embed and prove digital copyright watermarks", Proc. of the European Conf. on Multimedia Applications, Services and Techniques, Univ. Catholique Louvain, Louvain, Belgium, vol. 2, 1996, pp. 695-709; Zhao J., "A WWW Service to embed and prove digital copyright watermarks", Proc. of the European Conf. on Multimedia Applications, Services and Techniques, Univ. Catholique Louvain, Louvain, Belgium, vol. 2, 1996, pp. 695-709; Others.

*Primary Examiner* — Kostas Katsikis
(74) *Attorney, Agent, or Firm* — Staas & Halsey LLP

(57) ABSTRACT

Files which are available for dissemination in a controlled peer-to-peer network are provided with a watermark comprising a large number of watermark elements. Upon download, the composition of the parts of the file which are obtained from a plurality of source stations provides a new watermark which can clearly be associated with the target station. By storing information about forwarded watermark elements of a network server, it is possible to reconstruct for each file the network station from which this file originates.

19 Claims, 1 Drawing Sheet

(56) References Cited

U.S. PATENT DOCUMENTS

| | | |
|---|---|---|
| 6,704,432 B2 * | 3/2004 | Eversole et al. .............. 382/100 |
| 6,704,797 B1 * | 3/2004 | Fields et al. .................. 709/246 |
| 6,816,872 B1 * | 11/2004 | Squibb ................................. 1/1 |
| 7,320,009 B1 * | 1/2008 | Srivastava et al. ............ 707/625 |
| 8,145,908 B1 * | 3/2012 | Liu et al. ....................... 713/176 |
| 8,392,827 B2 * | 3/2013 | Challenger et al. ........... 715/255 |
| 2001/0054144 A1 * | 12/2001 | Epstein et al. ................ 713/161 |
| 2002/0052885 A1 | 5/2002 | Levy |
| 2002/0168082 A1 * | 11/2002 | Razdan ......................... 382/100 |
| 2002/0169721 A1 * | 11/2002 | Cooley et al. .................. 705/51 |
| 2003/0133591 A1 | 7/2003 | Watanabe et al. |
| 2003/0185417 A1 | 10/2003 | Alattar |
| 2003/0189499 A1 * | 10/2003 | Stricklin et al. .............. 340/933 |
| 2004/0064702 A1 * | 4/2004 | Yu et al. ....................... 713/176 |
| 2004/0151313 A1 | 8/2004 | Weirauch |
| 2005/0021970 A1 * | 1/2005 | Reese et al. .................. 713/176 |
| 2005/0030588 A1 * | 2/2005 | Reese et al. .................. 358/3.28 |
| 2005/0114296 A1 * | 5/2005 | Farber et al. ...................... 707/1 |
| 2005/0268102 A1 | 12/2005 | Downey |
| 2007/0297012 A1 * | 12/2007 | Fan ............................... 358/3.28 |
| 2009/0103774 A1 * | 4/2009 | Grossman .................... 382/100 |

FOREIGN PATENT DOCUMENTS

| | | |
|---|---|---|
| JP | 2001-257865 | 9/2001 |
| JP | 2003-15925 | 1/2003 |
| JP | 2003-78520 | 3/2003 |
| JP | 2003-204429 | 7/2003 |
| JP | 2004-46419 | 2/2004 |
| JP | 2004-236293 | 8/2004 |
| JP | 2004-295652 | 10/2004 |
| JP | 2007304888 A * | 11/2007 |
| WO | WO 03034634 A2 * | 4/2003 |
| WO | 2004/093448 A1 | 10/2004 |
| WO | WO 2005074597 A2 | 8/2005 |

* cited by examiner

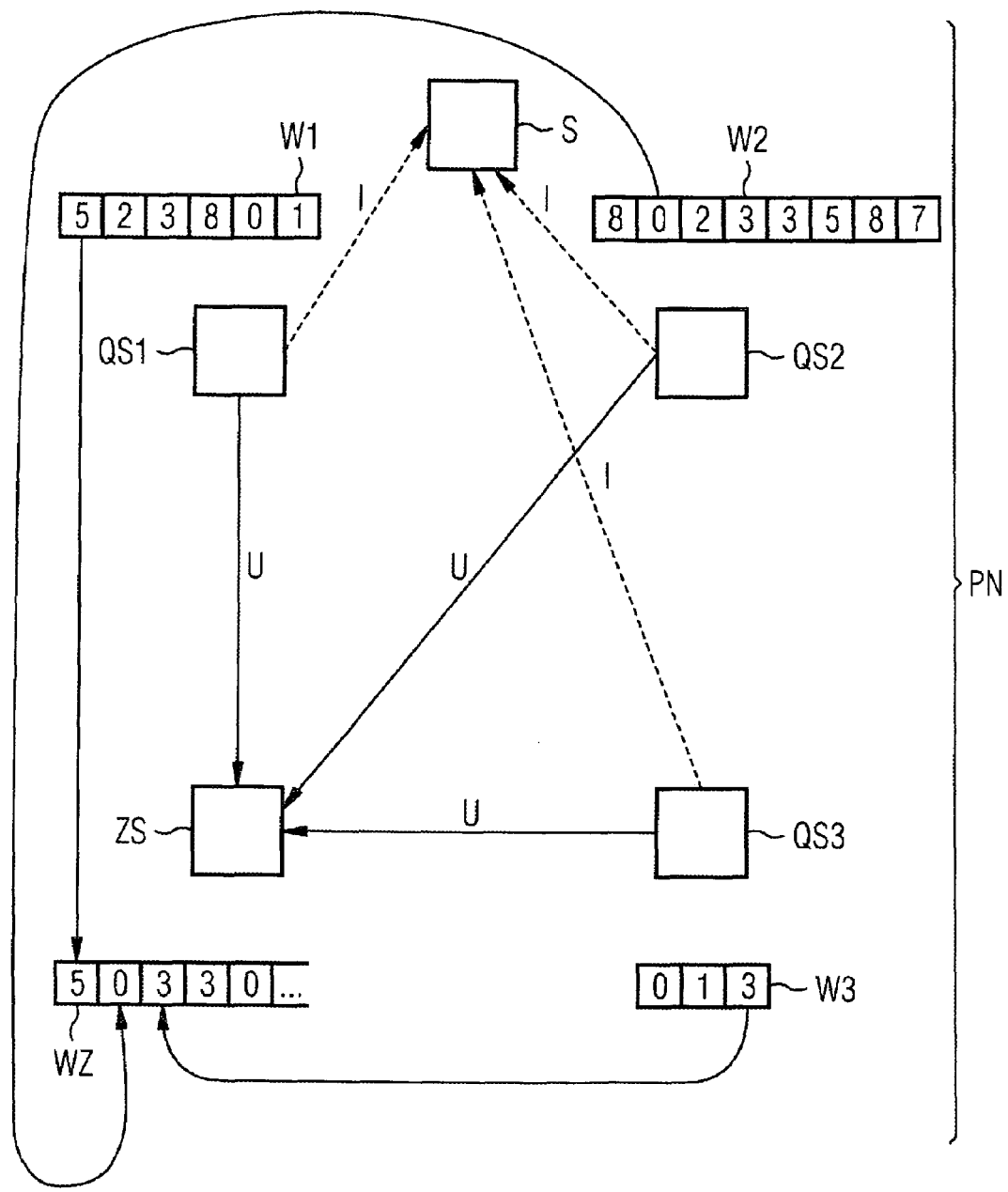

METHOD AND PEER NETWORK FOR ASCERTAINING THE PEER NETWORK ORIGINATING STATION FOR A FILE

CROSS REFERENCE TO RELATED APPLICATIONS

This application is based on and hereby claims priority to German Application No. 10 2005 058 006.8 filed on Dec. 5, 2005 and PCT Application No. PCT/EP2006/067678 filed on Oct. 23, 2006, the contents of which are hereby incorporated by reference.

BACKGROUND OF THE INVENTION

The invention relates to a method for determining the originating station of a file in a peer network.

The exchange of information in present-day networks, such as the Internet for example, generally operates according to the client-server principle. This means that a computer or a group of computers which represent a server make information available. Other network nodes or computers which require this information download it from the server.

This method has the disadvantage that the load involved in distributing the information lies solely on the server. The server must respond to all requests for a specific piece of information itself and send the information to the corresponding clients that submitted the request. This is particularly disadvantageous when a particular piece of information is new and consequently is requested by very many clients over a short period of time. An example of such information is a software update, for example an update for an operating system. In the case of such information it is necessary to provide a particularly powerful server which has the loadbearing capacity to handle the load imposed by the requests. A server of this kind is cost-intensive. However, if, after a short time, the number of requests for the information drops off, the full capacity of the server is no longer being used. The investment in the high-performance server system is therefore excessive after a short period of time.

An alternative that avoids the disadvantages mentioned are peer networks. These are networks composed of stations that are of equal status. An example of a peer network of this kind are the currently common peer-to-peer networks. Such peer networks are generally logical networks which are typically formed when a plurality of stations of a larger network, such as e.g. Internet, join forces to share resources.

The most important characteristic of the peer networks is that each station can act simultaneously as server and as client. This means that each station can request information and also make information available. Thus, if new information, such as a software update, for example, is to be made available, each station in a peer network automatically offers that part of the software update that is already stored on said station for downloading to other stations of the peer network.

Generally a server continues to be necessary, the server making the information, such as the software update for example, available to the peer network at least initially. However, the main load of information distribution now no longer lies with this server, but with the nodes of the peer network. These peer nodes are generally computers of users of the network. These computers are loaded with the task of information distribution to the extent possible according to the capability of their configuration. This means that the additional load generally goes unnoticed by the users of these computers and that the load distribution therefore is simply a better utilization of already existing resources.

Peer networks can also be used for disseminating multimedia content. Such multimedia content can be music or videos, for example. In this case it is ensured in a controlled peer network that the owners of the rights to the distributed content are remunerated in accordance with the distribution. It is not desirable in this case that content purchased in the peer network is disseminated outside of the peer network. If this happens nonetheless, for example in a further, uncontrolled peer network, the origin of a file distributed further in such a way can no longer be identified.

SUMMARY

Our potential object is to specify a way to determine the origin of a file from a peer network.

The inventors propose a method in which the following steps are carried out:

marking of files in a peer network with watermarks unique to stations of the peer network, said watermarks including a plurality of sub-watermarks;

comparison of a first watermark, determined from the file, of the first watermark with the unique watermarks;

determining of the peer network originating station from the result of the comparison.

In order to identify the originating station of the file, the watermark that is contained in it itself is therefore determined. Furthermore said watermark is compared with the unique watermarks which permit an inference to be drawn as to the originating station. From the result of the comparison it is possible to conclude whether the file originates from a station of the peer network or not.

What is understood by a watermark in a digital context is an additional piece of information which is inserted into an arbitrary file or a part of the file. In the case of a file having multimedia content, which is therefore intended for presentation to a human user, this additional information may be more or less visible. Thus, there are clearly visible watermarks such as manufacturer logos, for example. But there are also watermarks which are not noticeable to the human viewer or listener. Watermarks of said kind can be implemented, for example, by using the least significant bit of each byte in unencoded content for introducing the additional information, i.e. the watermark. A change to the least significant bit is not visible or audible to the human observer.

What is meant by watermark in this context is the totality of the additional information that is incorporated into a file in the peer network. By sub-watermark what is understood is the information which can be taken from a small part of a file. For example, a sub-watermark can comprise a small number of bytes. This means that what is understood by a sub-watermark is the additional information which is contained in a block of a few bytes in length in a file.

In an advantageous embodiment and development, information relating to parts of files transmitted in the peer network is stored, said information including at least the sub-watermarks contained in the transmitted parts of the files.

Files are generally transferred in parts in peer networks. When the parts are assembled, a complete file is thus obtained once again. The transmitted parts of files therefore also include transmitted complete files.

In addition to the transmission of files or parts of files in the peer network, therefore, information about transmitted parts is stored. By this it is possible to trace the transmission of the sub-watermarks in all the transmissions taking place in the peer network. This enables the watermark of each file to be reconstructed at every station of the peer network.

The stored information includes therein at least the sub-watermarks contained in parts of files transmitted in each case. This means that, for example, the watermark per se is stored, i.e. the additional watermark information which is incorporated into files in the form of the watermark. Alternatively it is also possible to store an identifier of the watermark. For example, different watermarks can be used which are identified by a sequential number. In this case it is sufficient to store the sequential number for a sub-watermark.

In an advantageous embodiment and development, information about transmitted parts is transmitted to a storage station. The storage station is a station inside or outside the peer network which stores such information relating to parts of files transmitted in the peer network. It can be a server installed for this purpose, or else a station of the peer network, for example. The centralized storage of the information reduces the risk of misuse and allows permanent access to the data.

In this arrangement the information is advantageously transmitted from the source or destination station to the storage station. It is particularly advantageous if the information is transmitted by both stations. If both destination and source station send the information to the storage station, the degree of resilience with regard to errors is increased on the one hand and on the other hand the risk of misuse on the part of the destination station ZS is reduced.

In an advantageous alternative, the information is stored in a decentralized manner in the peer network. In this way it is possible to distribute the overhead arising from the storage of the information among the stations of the peer network. As a result the resources of the peer network are used more efficiently and the storage overhead is reduced.

The following steps are advantageously carried out for marking files in the peer network:

providing at least two versions of the files, each of which is provided with at least one watermark having a plurality of sub-watermarks, the watermarks of the versions being different, in the peer network, during the transmission of at least a part of the file from a source station to a destination station in the peer network, transfer of the sub-watermarks in the part of the file from the source station to the destination station.

In the first step, therefore, at least two versions of files are made available in the peer network. In this case the versions made available contain different watermarks. This means that at least some of the sub-watermarks are different from one another, though ideally a large number of the sub-watermarks or even all the watermarks are different.

If parts of such files made available are now transmitted from a source station to a destination station in the peer network, the sub-watermarks contained in the parts of the files are transferred and consequently are also present in the parts of the files on the destination station.

When a file is transmitted in a peer network, said file is generally obtained from a plurality of sources. Since multiple versions of the file having different watermarks are available in the peer network, said watermarks become intermingled during the transmission to the destination station because the respective sub-watermarks of the different versions are transmitted together with the corresponding parts of the file. This results in a version of the file having a new watermark. Given a sufficiently large number of sub-watermarks in a file, each new watermark produced in this way at a new destination station is unique and can be used for identifying and determining said destination station.

In an advantageous development, the versions of files are generated by creating two copies of each of the files and providing them with different watermarks. The generated versions are then made available on at least one node in the peer network. In this case it is also possible that two or more provider stations in the peer network are basically responsible for providing the versions for new files.

Alternatively it is also possible that in order to provide the versions the files are made available without a watermark. If parts of the files which do not yet contain any watermarks are now transmitted, a watermark, including one, two or more sub-watermarks, is added automatically to these parts. This alternative has the advantage that a plurality of different versions are generated automatically and at the same time the load involved in their generation is once again shared among the network nodes of the peer network.

In a further advantageous embodiment and development it is ascertained whether the transmission of at least one large part of a file is performed by only one source station ("a primary source station") and in this case the sub-watermarks are redefined in at least the large part of said file at the destination station. The sub-watermarks can be modified in the process, i.e. the new sub-watermarks are related to the transmitted sub-watermarks. Alternatively, they can also be defined independently of the transmitted sub-watermarks, by random selection for example.

This advantageously avoids a situation in which, when a file is transmitted by a small number of source stations or in the worst case by only one source station, the watermark of said file is transferred to the destination station with no or only minor changes. This in turn maintains the uniqueness of the identification by the watermark.

In an advantageous development, only one version of the file is made available in the peer network for the purpose of providing the versions. The first transmissions of said file are then effected automatically by only one or a small number of sources and the transmitted files are assigned new sub-watermarks. In this way many different versions of said file are advantageously generated automatically.

According to the method, a very large number of sub-watermarks are preferably used for the watermark. By this means the uniqueness of the watermark is guaranteed even in the case of a very large number of peer network nodes and therefore file versions.

It is possible for all the sub-watermarks to be the same size. This simplifies processing and evaluation.

Alternatively it is also possible for the sub-watermarks to be of different sizes. This has the advantage that a misuse due to deliberate removal of the watermarks from a file is made more difficult.

Preferably the sub-watermarks can at least partially overlap. This means that a plurality of watermarks are inserted at least in certain bytes of a file. This has the advantage that the security of the watermarks is increased and their removal rendered more difficult.

Preferably the transmission of the part of the file from the source station to the destination station takes place in packets in such a way that at least one sub-watermark or all sub-watermarks are transmitted in full in the part of the file. In this way it is guaranteed that the sub-watermarks remain identifiable even after the transmission from the source station to the destination station.

For this purpose the size of the packets and the size of a sub-watermark are preferably chosen such that the packet size is a common integer multiple of the sizes of the sub-watermarks. In this case the packet size can also be equal to the size of the sub-watermarks.

The peer network includes a plurality of network stations. These can operate as source station and as destination station for the transmission of at least parts of files. The network stations are embodied to perform the marking and transmission of information to the storage station.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a peer network comprising three source stations, a destination station and a storage station.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

In the exemplary embodiment it is shown how it is ascertained for a file from which station in a peer network PN said file originates. For this purpose it is basically necessary to mark the files that are distributed in the peer network. Furthermore the marking must be effected preventively. If a search is made as to the origin of a file, no further marking can be done at this time. It is also necessary to have knowledge about the markings in the files distributed in the peer network PN. In the exemplary embodiment this knowledge is stored in a central storage device.

FIG. 1 shows how the marking with watermarks is performed in an exemplary peer network PN. In this example all the distributed files are marked. Alternatively it is possible to mark only certain files, video files for example, although in that case only the origin of said marked files can then be determined.

The exemplary peer network PN contains four peer network nodes, of which in this example three operate as source stations QS1 . . . 3, and one as a destination station ZS. As usual in peer networks, it is also possible in this case for each station to operate as a source or destination station.

The destination station would now like to receive a file from the peer network PN. Said file has been made available in the peer network PN in three different versions with three different watermarks W1 . . . 3. These are contained at least in parts on the source stations QS1 . . . 3.

Parts of the file are now transmitted in data transmissions U from the source stations QS1 . . . 3 to the destination station ZS. In this case the source stations QS1 . . . 3 have themselves stored different parts of the file.

These different parts contain different watermarks W1 . . . 3. In this case the watermarks W1 . . . 3 include sub-watermarks which are identified here by different digits. In this exemplary embodiment a sub-watermark of this kind extends over 1 KB of the file in each case. In the transmissions U, the file is therefore transmitted in 1 KB-sized blocks in each case, each containing a complete sub-watermark.

As a result of the transmissions U from the different source stations QS1 . . . 3, a new watermark WZ is generated at the destination station, said new watermark being produced from the different sub-watermarks of the watermarks W1 . . . 3 in the source stations QS1 . . . 3.

Information I is transmitted from the source stations QS1 . . . 3 to the storage station S simultaneously with the transmissions U. In an alternative embodiment variant the information I can also be transmitted by the destination station ZS or additionally by the destination station ZS to the storage station S. The information I contains the sub-watermarks transmitted in the transmissions U together with a respective indication of the position of the sub-watermark in the file. As a result the storage station S is able, after the transmission of the complete file to the destination station ZS, to specify the watermark WZ resulting there.

In an alternative embodiment variant the information I is stored only in the respective source station QS1 . . . 3. If the information I is required for identification purposes, the information I, stored non-centrally in this case, is retrieved from the stations of the peer network PN. In a further alternative the destination station ZS, after receiving the complete file, sends information I to the storage station S, the information I in this case containing the complete new watermark WZ. It is also possible to combine the aforementioned alternatives. If both destination and source station ZS, QS1 . . . 3 send the information I about the transmitted file to the storage station S, this increases the resilience with regard to errors on the one hand and on the other hand reduces the risk of misuse on the part of the destination station ZS.

In this case the sub-watermarks are stored and/or transmitted in such a way that in one alternative the watermark per se, i.e. the additional information embedded in files by the watermark, is stored or transmitted. Alternatively, an identifier for a watermark can also be transmitted and/or stored. For example, a sequential number for the watermarks used in the peer network PN can be stored here.

If the file is now distributed outside of the peer network PN, it can be ascertained, by comparing the watermark WZ of the file with the information of the storage station S, from which originating station this file has come.

It is possible in this case that some of the sub-watermarks cannot be reconstructed correctly by the storage station S, due to errors in the transmission U to the destination station ZS or to the storage station S, for example. By virtue of the large number of sub-watermarks it is, however, ensured that such a great number of possibilities for watermarks exists that even a similarity of a watermark to the information I stored in the storage station S can be rated as equality. According to this example, a film 500 MB in size contains 500,000 sub-watermarks. With only ten different sub-watermarks the result obtained for the exemplary file is 10500000 different watermarks WZ, W1 . . . W3.

If a destination station ZS finds only one or a small number of source stations QS1 . . . 3 for the transmission of a file, it is possible that the watermark WZ will change only insignificantly during the transmission U. If, for example, the entire file is transmitted from the second source station QS2 to the destination station ZS, then the same watermark WZ results there as at the second source station QS2, which would therefore prevent a unique identification of the station on the basis of the watermark. In this case the destination station ZS automatically replaces the transmitted sub-watermarks with new, for example randomly chosen sub-watermarks. In this way it continues to be ensured that the watermarks WZ, W1 . . . 3 of the files present in the peer network PN are to be uniquely assigned to the respective station. Alternatively it is also possible that in this case the storage station makes new sub-watermarks available.

In one embodiment variant, files are made available in the peer network PN in such a way that one version of the file is provided. When said version is distributed in the peer network, a download takes place automatically from only one or a small number of source stations QS1 . . . 3 initially. This results in the file automatically being provided with new sub-watermarks, as a result of which many different versions are generated in the peer network PN.

In this exemplary embodiment ten different sub-watermarks have been shown. In order to provide greater security and make a deliberate changing of the sub-watermarks outside the transmissions U of the peer network PN more difficult, a greater number of different sub-watermarks can be used. These can also be encoded in different ways into the data of the file.

It is also possible to choose sub-watermarks of different size. In addition these can also be used in an overlapping manner. In this case it makes sense to transmit files in packets whose size is a common integer multiple of the sizes of the sub-watermarks. In the case of sub-watermarks with a length of ten and fifteen bytes the file could be transmitted in packets with a length of 30 bytes or 3000 bytes. In this case it also makes sense to arrange the sub-watermarks in the file in such a way that they always lie completely within a packet, by alignment with the packet boundaries for example.

It is possible to prompt the respective source stations QS1 . . . 3 or the destination station ZS of the peer network PN to communicate the information I about transmitted parts of files to the storage station S by way of an incentive method.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for identifying a destination station receiving a file transmitted in a peer network comprising a plurality of source stations and the destination station, comprising:
   providing a plurality of copies of a file;
   generating a plurality of different versions of the file by assigning a different watermark to each copy of the file;
   providing the different versions of the file respectively from different source stations, such that the watermark of each copy of the file is unique to the respective source station; wherein
      the file is formed from different parts, each part having a sub-watermark,
      for each version of the file, the sub-watermarks of the parts together form the watermark for the version of the file;
   separately transmitting the parts of the file from at least two different source stations to the destination station, each part of the file being transmitted with its respective sub-watermark;
   assembling the parts of the file at the destination station;
   assembling the sub-watermarks of the parts of the file at the destination station to thereby form a watermark for the destination station;
   storing information identifying the sub-watermarks of the parts of the file; and
   identifying the destination station based on the information.

2. The method as claimed in claim 1, wherein
   the destination station acts as an originating station and transmits at least a part of the file together with the respective sub-watermark, to a peer in the peer network,
   the peer forms a subsequent watermark unique to the peer, the subsequent watermark being determined from the sub-watermarks respectively associated with the parts of the file received at the peer,
   the subsequent watermark is compared with the information, and
   the originating station in the peer network is determined from a result of the comparison.

3. The method as claimed in claim 1, wherein
   the information is transmitted to a storage station in the peer network for storage.

4. The method as claimed in claim 3, wherein
   the information is transmitted by the source station and/or the destination station.

5. The method as claimed in claim 1, wherein
   the information is stored non-centrally in the peer network.

6. The method as claimed in claim 1, wherein
   the watermark of the destination station is stored as the information.

7. The method as claimed in claim 1, wherein
   if many parts of the file were transmitted by only one of the source stations, this source station is considered a primary source station, and
   the sub-watermarks associated with the many parts of the file are redefined for the file at the destination station.

8. The method as claimed in claim 7, wherein
   the sub-watermarks are redefined at the destination station based on sub-watermarks received from the primary source station.

9. The method as claimed in claim 7, wherein
   the sub-watermarks are redefined independently of the sub-watermarks received from the primary source station, and
   the sub-watermarks are redefined by random selection.

10. The method as claimed in claim 1, wherein a large number of sub-watermarks are used.

11. The method as claimed in claim 1, wherein all sub-watermarks are equal in size.

12. The method as claimed in claim 1, wherein
    the sub-watermarks are different in size.

13. The method as claimed in claim 1, wherein
    each sub-watermark has information which at least partially overlaps a different sub-watermark.

14. The method as claimed in claim 1, wherein
    each part of the file is transmitted from the source station to the destination station in a packet, and
    each packet contains the complete sub-watermark.

15. The method as claimed in claim 14, wherein
    the sub-watermark and the packet have sizes such that the size of the packet is an integer multiple of the size of the sub-watermark.

16. The method as claimed in claim 1, wherein
    the information is structured in such a way each sub-watermark is saved in a file with a respective indication of a position of the associated part of the file within the file.

17. The method as claimed in claim 1, wherein
    an identifier of the watermark is stored as the information.

18. The method as claimed in claim 1, wherein
    each sub-watermark has a sequential number identifying where the part of the file fits within the file,
    the sequential numbers for the sub-watermarks are stored as the information.

19. A peer network comprising:
    a plurality of source stations to provide different versions of a file, the different versions of the file being formed by providing a plurality of copies of the file and assigning a different watermark to each copy of the file, such that each copy of the file has a watermark unique to the respective source station, wherein
       the file is formed from different parts, each part having a sub-watermark, for each version of the file, the sub-watermarks of the parts together form the watermark for the version of the file;

a destination station to separately receive the parts of the file from at least two different source stations, each part of the file being transmitted with its respective sub-watermark, the destination station assembling the parts of the file and assembling the sub-watermarks of the parts of the file to thereby form a watermark for the destination station; and a memory to store information identifying the sub-watermarks of the parts of the file to identify the destination station based on the information.

\* \* \* \* \*